C. P. HALL.
PIPE JOINT.
APPLICATION FILED JAN. 29, 1910.
1,030,237.
Patented June 18, 1912.
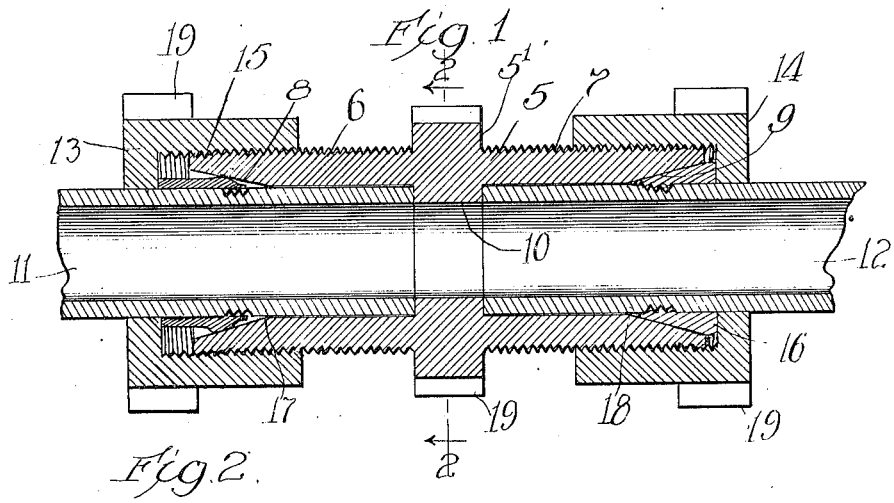
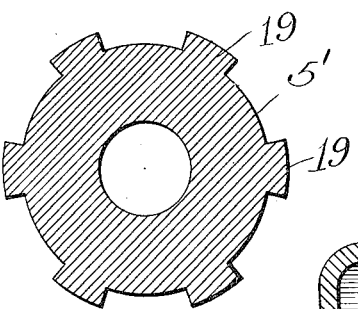
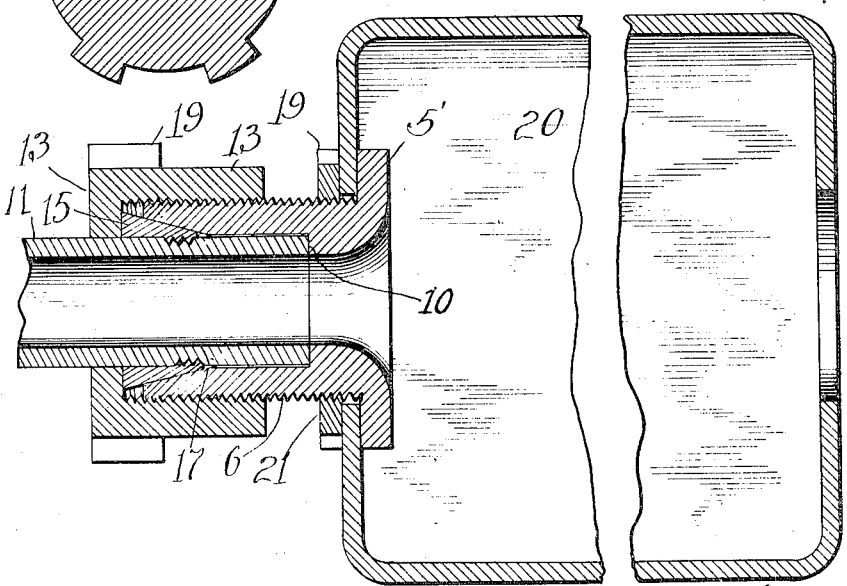
Witnesses.
R. A. White.
R. L. White.
Inventor:
Chester P. Hall,
By Foree Bain & May
Attys.

UNITED STATES PATENT OFFICE.

CHESTER P. HALL, OF CHICAGO, ILLINOIS, ASSIGNOR TO DELTA-STAR ELECTRIC COMPANY, OF CHICAGO, ILLINOIS, A CORPORATION OF ILLINOIS.

PIPE-JOINT.

1,030,237.  Specification of Letters Patent.  Patented June 18, 1912.

Application filed January 29, 1910. Serial No. 540,798. REISSUED

*To all whom it may concern:*

Be it known that I, CHESTER P. HALL, a citizen of the United States, residing at Chicago, in the county of Cook and State of Illinois, have invented certain new and useful Improvements in Pipe-Joints, of which the following is a specification.

My invention relates to improvements in pipe joints and more particularly to devices of the character described for joining adjacent ends of electrical-conduit tubing or pipe.

One of the objects of my invention is to provide a joint that will firmly and strongly hold the adjacent ends of the conduit pipe without the necessity of decreasing the internal diameter thereof.

Another object of my invention is to provide a joint that may be readily and quickly applied without removing the protecting enamel from the surface of the pipe where the pipe will be exposed to the oxidizing influence of the atmosphere. And still another object of my invention is to provide a joint that may, when necessary, be used on pipe having threads or grooves cut in the exterior surface of the ends, and which will cover and protect the threads thereof from the destructive effects of the atmosphere.

Other and further objects of my invention will become readily apparent to persons skilled in the art to which it appertains from the description and drawings, wherein—

Figure 1 is a longitudinal section showing the joint applied to the ends of two adjacent pipes, showing one joint completed and the other ready to be tightened up; Fig. 2 is a cross sectional view taken on line 2—2 of Fig. 1; and Fig. 3 is a longitudinal section showing one side of the double joint, or single joint, used to connect a conduit pipe to a junction or outlet box.

In all of the views, the same reference characters indicate similar parts.

A sleeve, 5, as shown in Fig. 1, is exteriorly screw-threaded at both ends, as at 6 and 7. It is slightly tapered inwardly at both ends, as at 8 and 9, and is provided with a concentric, preferably central, interior shoulder, 10, preferably equal to the thickness of the walls of the pipes, 11 and 12, so as to leave no abrupt or sharp interior surfaces, and to form an abutment against which the ends of the respective pipes are presented.

Each end of the fitting is provided with a centrally bored, interiorly threaded cap, indicated by 13 and 14, which screws on the respective ends, 6 and 7, of the sleeve, 5. The bore is just large enough to admit the introduction of the ends of the pipe. Tapered rings, 15 and 16, are made preferably of a relatively soft malleable metal, such as yellow brass, white metal, or the like, and fit the pipe snugly and before assemblage may provide enlargements, or bumps, (not shown) on the tapering face 8, for an advantage to be described.

To apply the joint, each pipe is preferably scarfed, with a plurality of grooves cut into the pipe, as at 17 and 18. This can be conveniently and quickly done by means of one turn of a pipe cutter. The threaded caps, 13 and 14, and tapered rings, 15 and 16, are first placed on the respective ends of the pipe or conduit, the ends of the pipe are then scarfed by means of a suitable cutter, as shown, and said ends are then introduced in the respective tapered ends of the sleeve and the caps are screwed on to the respective ends of the sleeve.

The effect of the tightening of the caps on the ends of the sleeve results in forcing the rings, 15 and 16, into intimate contact therewith and with the associated pipe ends; ad in reducing the hump of the ring and forcing the metal into the scarfs, 17 and 18, as shown at the right in Fig. 1, and in Fig. 3.

The rings, being made of relatively soft malleable metal are contracted to some extent by the applied force and produce watertight joints between the sleeve and the pipe ends, and furthermore, portions of the rings will thereby be forced into the scarfs cut by the scarf cutter into the pipe, as shown at 17 and 18, and thereby a positive retaining means is produced, rendering separation of the parts practically impossible while the caps are in place.

For the purpose of conveniently rotating the sleeve and caps, I provide wings, as shown at 18, on the peripheral surface and use an ordinary spanner wrench for engagement therewith. Of course, these surfaces can be made smooth and a pipe wrench employed to turn the said caps or they may be provided with plural flat parallel surfaces and turned with a monkey wrench or the like.

20 is an ordinary junction or outlet box, usually used in interior conduit systems, showing the manner of attaching my fitting thereto. In this case, only one half of the fitting shown in Fig. 1, or a single joint fitting is used, and a check nut, 21, is employed for holding it in intimate contact with the box.

The act of forcing the tapered ring, 15, between the pipe and the sleeve tends to contract the ring and to expand the sleeve, thereby making water-tight joints between these parts, forcing parts of the rings into the scarfs cut on the pipe, and effecting a more intimate contact between the cap and the end of the sleeve, thereby to more firmly hold the cap in place.

The circumferential enlargement near the smallest tapered end of the sleeve is an essential part of the invention, as by this means, portions of the rings are forced into the threads or scarfs cut into the surface of the pipe.

Havng thus described an embodiment of my invention, what I claim is:

1. In a pipe joint, the combination, with a pipe having a normally non-threaded end of a sleeve to receive the pipe end, said sleeve exteriorly threaded and interiorly tapered near its end, a ring of soft malleable metal adapted to surround the pipe and tapered for coaction with said tapered sleeve upon the application of pressure thereto to hold the pipe, and a cap threaded for engagement with said sleeve and for forcing said tapered ring into contact therewith, said pipe having cut therein at approximately the inner edge of the taper of said sleeve a sharp edged groove for reception of a sharp thread of said ring to be forced thereinto upon operation of said threaded cap.

2. In a pipe joint, the combination with a pipe, having a normally non-threaded end, of a sleeve to receive the pipe end, said sleeve exteriorly threaded and interiorly tapered near its end, an interior shoulder against which the pipe end abuts, a ring of soft malleable metal surrounding the pipe and tapered by the application of pressure thereto to wedge between said tapered portion of the sleeve, and pipe, and a cap threaded for engagement with said sleeve and forcing said tapered ring into contact therewith, said pipe having cut therein a groove adjacent the small edge of said tapered ring for reception of the extreme edge of said tapered malleable ring forced thereinto upon operation of said cap.

3. In a pipe joint, the combination of a pipe end having made therein (as by a single turn of a pipe cutter) a sharp edged groove at a suitable distance from the end thereof, a sleeve for fitting over said pipe end providing a shoulder to receive in contact therewith the end of said pipe, the interior surface of said sleeve providing a flaring portion extending outwardly from said groove in the pipe end and the exterior surface of said sleeve being screw-threaded, an interiorly screw-threaded cap for engagement with said screw threads of the sleeve, and a wedge ring of soft malleable metal tapering to provide on one side a pointed annular edge, said wedge ring lying with its pointed edge within the tapering space between the sleeve and pipe end, said ring being by turning of the cap, forcibly wedged into said space, and the pointed edge lying in the groove of said pipe end as, and for the purpose described.

4. In a pipe joint, the combination with a pipe end having a groove therein and a non-threaded portion adjacent said groove, of a sleeve providing an interior surface for coaction along the outer surface of the pipe, and a surface flaring outwardly to overlie said non-threaded portion, whereby there is included between said flaring surface of the sleeve and said non-threaded portion of the pipe an inwardly tapering space said space ending substantially at the groove in said pipe, a ring of malleable metal, and a cap adapted to be moved toward said ring to press the latter into said tapering space and groove, as described.

5. In a pipe joint, the combination, with a pipe end having a groove therein and a non-threaded portion adjacent said groove, of a sleeve providing an interior surface for coaction along the outer surface of the pipe end, and a surface flaring outwardly to overlie said non-threaded portion, whereby there is included between said flaring surface of the sleeve and non-threaded portion of the pipe an inwardly tapering space said space ending substantially at the groove in said pipe, a ring of malleable metal tapering toward one side to provide a pointed annular edge and having adjacent its edge an enlargement, and a cap adapted to be moved toward said ring to press the latter into said tapering space between the sleeve and pipe and to press said enlargement down into said groove.

6. In a pipe joint, the combination, with a pipe end having a groove therein, of a sleeve providing an interior surface for coaction along the outer surface of the pipe and a surface flaring outwardly to provide between said flaring surface and the pipe a tapering space said space ending substantially at said groove, a tapering ring having an enlargement at its smaller end, and a cap adapted to be moved against said ring to press it into said tapering space between the sleeve and pipe and to press said enlargement down into said groove, as described.

In testimony whereof I hereunto set my hand in the presence of two witnesses.

CHESTER P. HALL.

In the presence of—
W. LINN ALLEN,
MARY F. ALLEN.